United States Patent [19]
Eylon

[11] Patent Number: 5,376,476
[45] Date of Patent: Dec. 27, 1994

[54] BATTERY ORIENTATION-INDIFFERENT BATTERY RECEPTOR

[76] Inventor: Dan Eylon, 10 Ben Yosef, Ramat Aviv B, 69125 Tel Aviv, Israel

[21] Appl. No.: 161,359

[22] Filed: Dec. 6, 1993

Related U.S. Application Data

[63] Continuation-in-part of Ser. No. 100,852, Aug. 2, 1993.

[51] Int. Cl.⁵ .............................................. H01M 2/02
[52] U.S. Cl. ........................................... 429/1; 429/7; 429/9; 429/96; 429/97; 429/100
[58] Field of Search .................. 429/1, 7, 9, 96, 97, 429/100

[56] References Cited

U.S. PATENT DOCUMENTS 3,984,257  10/1976  Zurcher .................................. 429/1
5,229,220  7/1993   Stanton et al. ......................... 429/1

FOREIGN PATENT DOCUMENTS 86709  5/1977  Australia .

*Primary Examiner*—Prince Willis, Jr.
*Assistant Examiner*—M. Nuzzolillo
*Attorney, Agent, or Firm*—Mark M. Friedman

[57] ABSTRACT

A battery receptor to make it possible to insert a battery having a protruding end and a flat end in either orientation which includes a first pair of contacts which is mounted at one end of the receptor and which is capable of accommodating one end of the battery and a second pair of contacts which is mounted at the other end of the receptor for accommodating the other end of the battery. Each of the pair of contacts is made up of two members—an electrically conductive retainer member and an electrically conductive flat contact, both of which are rigidly connected to the battery receptor. The retainer member is in electrical contact with one of the two receptor electrical contacts while the flat contact is in electrical contact with the other of the receptor electrical contacts. The retainer member is sized and shaped to retain the flat end of the battery but not the protruding end of the battery while the flat contact, which is adjacent to, and separated from, the retainer member and on the side of the retainer member away from the battery, is capable of electrically contacting the protruding end of the battery.

10 Claims, 2 Drawing Sheets

BATTERY ORIENTATION-INDIFFERENT BATTERY RECEPTOR

This is a continuation-in-part of U.S. patent application Ser. No. 08/100,852, filed Aug. 2, 1993.

FIELD AND BACKGROUND OF THE INVENTION

The present invention relates to battery housings or receptors and, more particularly, to battery housings or receptors which are able to properly accommodate an inserted battery regardless of the polarity of the inserted battery.

A multitude of battery-operated devices and systems are in current use. Each device is operated by one or more batteries which must be inserted into a battery housing or receptor (hereinafter "receptor") which is typically, but not necessarily, integrally formed with the device. In addition, there are a variety of battery chargers which can be used to charge rechargeable batteries. The batteries used may be of various voltages, sizes and shapes and may or may not be rechargeable.

Conventional battery receptors feature two contacts, one designed to electrically contact with the positive electrode of the battery while the other is designed to electrically contact the battery's negative electrode. In virtually all devices, the polarity is of crucial importance in the sense that the device will not operate unless the battery is properly inserted into the receptor, i.e., is inserted with such an orientation that each of the battery electrodes contacts the correct receptor contact. In certain devices, a reversal of the battery orientation can actually damage the device. To avoid such damage, some devices are equipped with suitable reverse-biased diodes which act as one-way valves to prevent flow of current in the wrong direction.

To help insure that the batteries are inserted in the proper orientation, the manufacturers of most battery-operated devices often provide a drawing or diagram, printed or embossed on, in, or in the vicinity of, the battery receptor, indicating the proper orientation in which the batteries should be inserted into the receptor. The intent is that the operator consult such drawings or diagrams prior to inserting the batteries.

Unfortunately, the drawings or diagrams are often ignored by the operator. In other cases, the drawings are difficult to read or interpret, especially in less than ideal lighting or when the operator is a child or a person of otherwise limited capacity to see, understand and/or implement the instructions implicit in the battery installation drawing or diagram. The problem is only compounded when two or more batteries must be inserted, often with different orientations, for example, to effect a series or parallel electrical connection between the batteries.

There is thus a widely recognized need for, and it would be highly advantageous to have, a device, or battery receptor, which will make it possible to install batteries into a battery-operated device without regard to their orientation and which will automatically adjust the polarities to render the installed battery operative.

SUMMARY OF THE INVENTION

According to the present invention, there is provided a battery receptor to render operative an inserted battery having a protruding portion and a flat portion regardless of the orientation of the inserted battery, comprising: (a) a first pair of contacts mounted at one end of the receptor for accommodating one end of the battery; (b) a second pair of contacts mounted at the other end of the receptor for accommodating the other end of the battery; each of the pair of contacts characterized in that each pair includes: (i) an electrically conductive retainer member rigidly connected to, or integrally formed with, the battery receptor, the retainer member being in electrical contact with a first receptor electrical contact, the retainer member being sized and shaped to retain the flat end of the battery but not the protruding end of the battery; and (ii) an electrically conductive flat contact rigidly connected to, or integrally formed with, the receptor, the flat contact being in electrical contact with a second receptor electrical contact, the flat contact being adjacent to, and separated from, the retainer member and on the side of the retainer member away from the battery.

According to further features in preferred embodiments of the invention described below, each of the retainer elements is formed with a cutout sized to allow the protruding portion of the battery to penetrate the plane of the retainer element.

According to still further features in the described preferred embodiments, the retainer member and the flat contact of each of the pairs of contacts are rigidly connected to each other, preferably with electrically insulating material interposed between the retainer member and the flat contact.

The present invention successfully addresses the shortcomings of the presently known configurations by providing a battery receptor, or housing, which is capable of accommodating a conventional battery so as to render an inserted battery operative regardless of in which of two possible orientations the battery was actually inserted. A battery receptor according to the present invention includes two pairs of contacts, one at each end of the battery receptor. Each pair of contacts includes one contact which, because of its shape, can only be utilized by the flat end of a battery and a second contact, located beyond the first contact, which, because of the presence of the first contact, can only contact the protruding end of the battery.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a device which can be incorporated into, or used in conjunction with, a battery receptor for the purpose of detecting the polarity of an inserted battery and adjusting the polarity of the receptor to accommodate the battery regardless of its polarity.

The principles and operation of a battery receptor according to the present invention may be better understood with reference to the drawings and the accompanying description.

Figure 1:
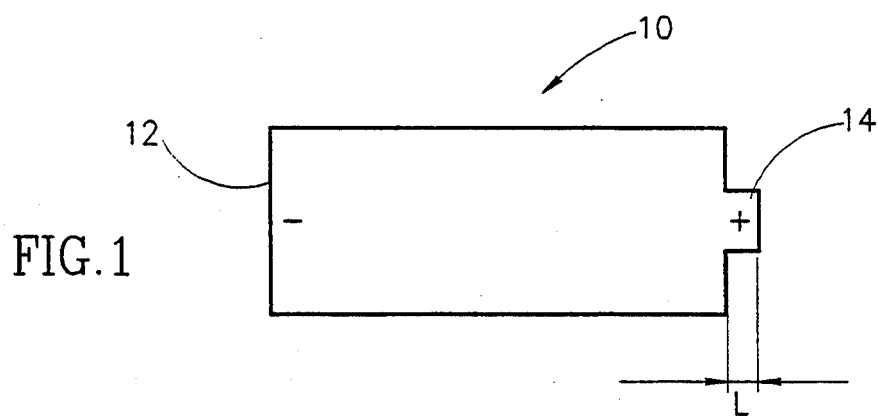
FIG. 1 is a schematic depiction of an ordinary battery which may be used with the present invention.

Referring now to the drawings, FIG. 1 illustrates in cross section a typical battery 10. A wide variety of battery shapes and sizes are in use. However, a very large fraction of currently available batteries are of the general shape shown in FIG. 1, i.e., the batteries are cylindrical with a first end 12 being of a first diameter, typically the same as the diameter of the battery body, and a second end 14 including a protrusion, typically cylindrical in shape, which projects axially from the battery body and which has a dimension, typically a diameter, which is significantly smaller than the diameter of first end 12.

Typically, but not always, first end 12 is connected to the negative electrode while second end 14 is connected to the positive electrode, as indicated in FIG. 1. It is to be noted that the present invention does not depend on the battery being of the specific shape or polarity shown in FIG. 1 and that other shapes and the opposite polarity convention can also be accommodated using devices according to the present invention, with appropriate changes, which will be readily apparent. For example, some 9 V batteries feature a pair of contacts, both of which are located at the same end of the battery, rather than being located at opposite ends, as in the battery depicted in FIG. 1.

The battery shape and polarity of FIG. 1, which is believed to be in most widespread use, was selected for illustrative purposes only and its use is not intended to in any way limit the scope of the present invention. Thus, for example, when reference is made throughout the specification and claims to an 'end' or to 'ends' of the battery, the intent is to designate a pole or the poles of the battery which are used to make electrical contact with the receptor, regardless of their precise location, so that, in some battery types, the 'ends' may, for example, be on the same side of the battery, or 90° apart and need not be diametrically opposed.

The adjustment of the polarity of the battery receptor may be effected in several ways. For example, the receptor could include a voltage-sensitive relay which reverses the polarity whenever necessary. Alternatively, a diode rectifier configuration could be used to accomplish the same goal. A disadvantage of both of these solutions is that they use a certain fraction of the available battery energy to operate, thereby reducing the overall power and useful life of the battery.

Figure 2:
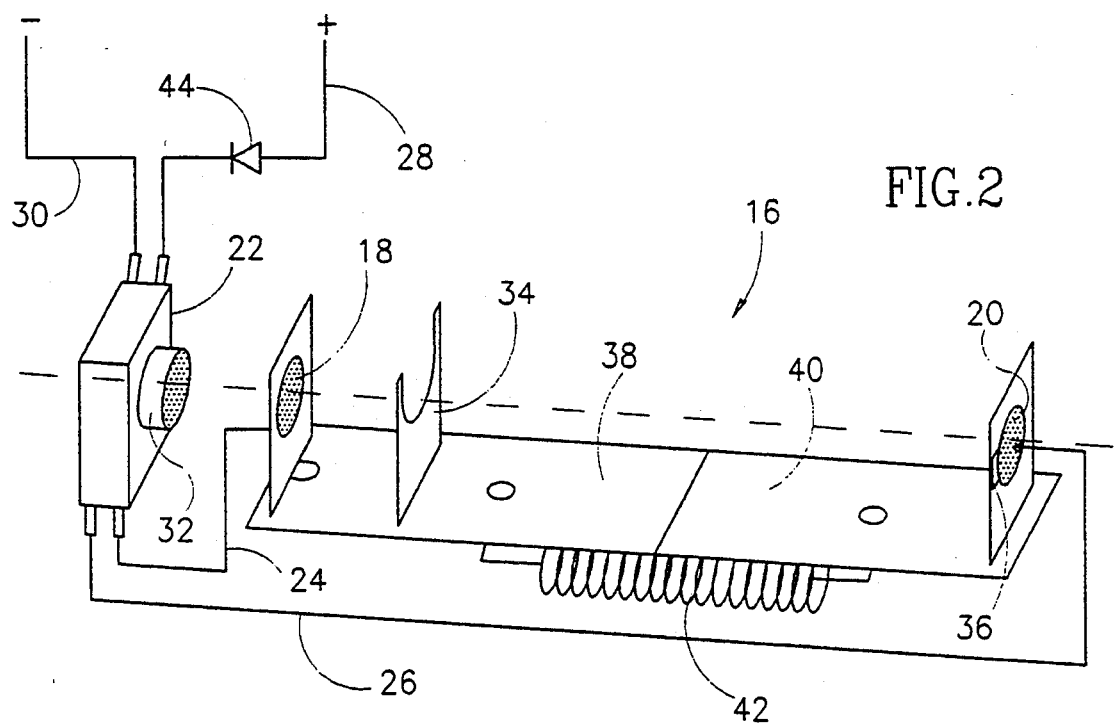
FIG. 2 is an exploded perspective view of one embodiment of a battery receptor according to the present invention.

Shown in FIG. 2 is a schematic exploded view of an illustrative battery receptor 16 according to a first embodiment of the present invention. Battery receptor 16 includes a pair of electrical contacts which, for purposes of exposition, will be referred to as first receptor electrical contact 18 and second receptor electrical contact 20. First receptor electrical contact 18 and second receptor electrical contact 20 are electrically connected to a suitable switching mechanism 22, preferably including a suitable microswitch, an example of which is described in more detail immediately below, through electrical leads 24 and 26, respectively.

Switching mechanism 22 has, as its output, a pair of electrical leads which supply electrical power to the battery-operated device, such as portable radio, and the like (not shown). Shown in FIG. 2 are the positive and negative output leads, 28 and 30, respectively from switching mechanism 22.

Switching mechanism 22 is designed to connect electrical leads 24 with 28 and electrical leads 26 with 30 or, alternatively, to connect electrical leads 24 with 30 and electrical leads 26 with 28. Thus, for example, when battery 10 is inserted into receptor 16 such that its positive end 14 touches contact 20, it is desirable that switching means 22 act to connect electrical lead 24 with 30 and electrical lead 26 with 28.

Figure 3:
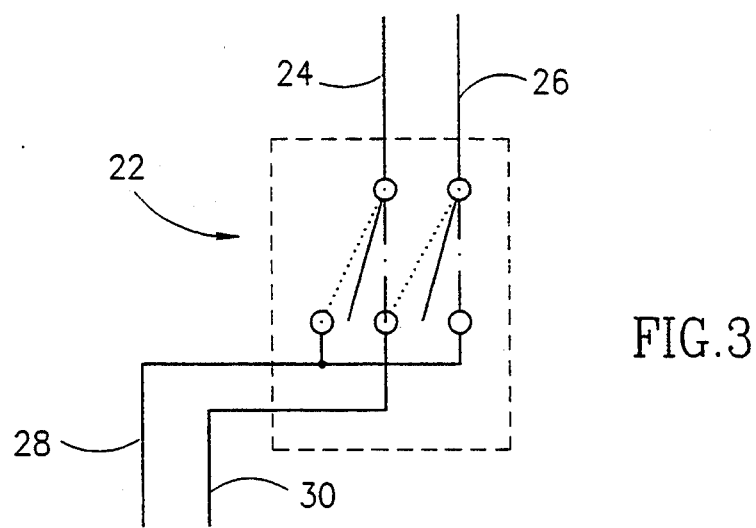
FIG. 3 is a schematic depiction of one example of a switching scheme which may be used as part of a device according to the present invention.

One illustrative type of switching means 22 is depicted in more detail in FIG. 3. Here, when switching means 22 is in one condition, indicated by the short-dashed lines, electrical contact is established between leads 24 and 28 and between leads 26 and 30. On the other hand, when switching means 22 is in a second condition, indicated by a line consisting of alternating short and long dashes, electrical contact is made between leads 24 and 30 and between leads 26 and 28.

Switching means 22 can be made to alternate between the two switching conditions by a variety of means, including, but not limited, the physical displacement of a mechanical switch 32 (FIG. 2), which is preferably mounted in the wall of battery receptor 16. Preferably, switch 32 is biased in one direction, preferably outwardly toward the right in FIG. 2, by a suitable biasing mechanism (not shown) such as a suitable spring. In this way, as long as switch 32 is not forced to the left, switching means 22 remains in one switching condition while, whenever switch 32 is forced to the left, switching means 22 is in the other switching condition.

Battery receptor 16 further includes a polarity-reversing assembly capable of reversing the polarity of receptor electrical contacts, 18 and 20, such that switching means 22 is in one of its conditions whenever battery 10 has been inserted in a first orientation, say, with positive end 14 toward the fight, and in its other condition when battery 10 has been inserted in the opposite orientation, say, with positive end 14 toward the left.

The polarity-reversing assembly is designed to determine the condition of switching means 22 based on the physical dissimilarity of the ends of battery 10. Several methods of effecting this may be envisioned, a preferred embodiment is illustrated in FIG. 2 and is described next.

The polarity-reversing assembly includes an electrically conductive retainer member 34 which is rigidly connected to, anchored by, or integrally formed with receptor 16. Retainer member 34 is electrically conductive and is in electrical contact with first receptor electrical contact 18. It should be remembered that FIG. 2 is an exploded view which depicts retainer member 34, first receptor electrical contact 18 and switch 32 as being widely separated. In reality, the three components are immediately adjacent each other, preferably touching.

Retainer member 34 is sized and shaped to be capable, in the case of a battery having polarity as shown in FIG. 1, of retaining, i.e., axially contacting, the negative end 12 of battery 10 but not the positive end 14 of battery 10, whose distal end is able to penetrate the plane of retainer element 34.

Illustrative retainer element 34 shown in FIG. 2 features a cutout which is dimensioned to allow positive end 14, but not negative end 12, of battery 10 to pass through the imaginary plane of retainer element 34.

Thus, whenever battery 10 is installed with positive end 14 to the right, retainer member 34 retains, or axially contacts, the outermost portion of negative end 12 of battery 10, preventing negative end 12 from depressing switch 32 which is outwardly biased, while serving as an electrical contact between negative end 12 of battery 10 and contact 18. Switching means 22 is designed such that when switch 32 is not depressed, lead 24 is connected to lead 30 and lead 26 is connected to lead 28.

By contrast, after battery 10 is installed with positive end 14 to the left, retainer member 34, because of the physical dimensions of retainer member 34 and of positive end 14 of battery 10, is not able to retain, or axially contact, positive end 14 of battery 10. As a result, positive end 14 of battery 10 is able to make direct electrical contact with contact 18 and is further able to depress outwardly-biased switch 32. Switching means 22 is designed such that whenever switch 32 is depressed, lead 24 is connected to lead 28 and lead 26 is connected to lead 30.

In this way, a system according to the present invention is able to ensure that battery 10 will be operative regardless of its orientation within receptor 16.

Preferably, a receptor 16 further includes a second switch 36, which may be similar in construction to switch 32. Second switch 36 is associated with second receptor electrical contact 20 and its function is to electrically enable second receptor contact 20 only when second switch 36 is being depressed by either positive end 14 or negative end 12 of battery 10. Second switch 36 thus serves to eliminate spurious polarity reversals during the period in which battery 10 is actually being installed into receptor 16, enabling the flow of current only when there is simultaneously electrical contact at first housing electrical contact 18 and second switch 36 is being depressed by one or the other of the ends of battery 10.

Preferably also, first and second receptor electrical contacts, 18 and 20 are biased toward each other to ensure proper electrical contacts and so as to be able to better accommodate batteries 10 of slightly differing lengths.

The biasing can be accomplished in a variety of ways. For example, one or the other of receptor electrical contacts 18 and 20 could be mounted on a support element, 38 and/or 40, which is, or are, movable with respect to the other contact or with respect to each other. The actual biasing may be achieved by connecting the one or more support elements 38 and/or 40 with the aid of a suitable spring 42 or similar mechanisms.

Preferably, lead 28 and/or lead 30 includes a suitably oriented reverse-biased diode to prevent damage to the battery-operated device in the event that, despite the presence of the polarity adjusting system according to the present invention, current attempts to flow to the battery-operated device in the wrong direction.

In a second embodiment according to the present invention, the switching mechanism and the mechanical switches are dispensed with and a system is provided which is able to accommodate a conventional battery inserted in either sense without the need to reverse the polarity of the contacts of the battery receptor.

Figure 4:
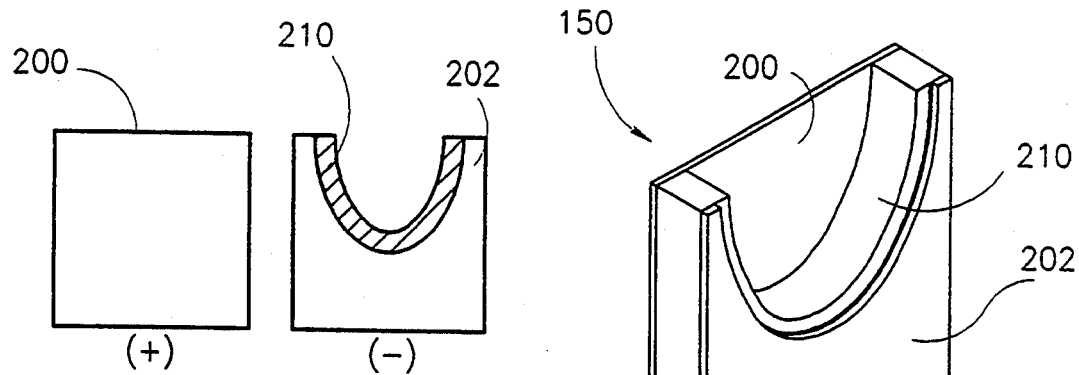
FIG. 4 shows in plan view the two conducting plates making up each pair of contacts according to a second embodiment of the present invention.
Figure 5:
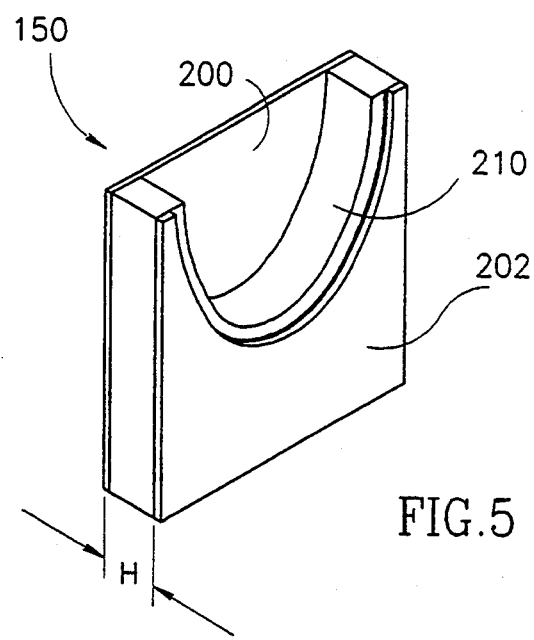
FIG. 5 is a perspective view of one possible configuration of a pair of contacts according to the second embodiment of the present invention.
Figure 6:
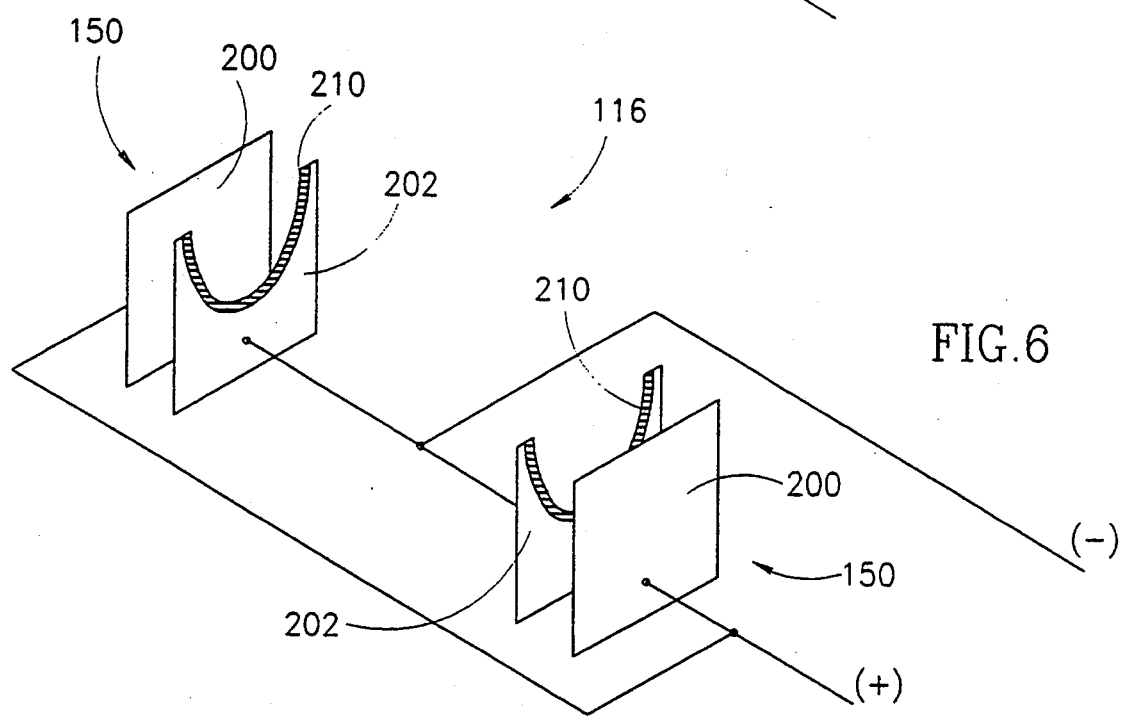
FIG. 6 schematically depicts the connections of the two pairs of contacts according to the second embodiment of the present invention.

FIGS. 4–7 depict various aspects of the second embodiment, whose principles of operations will be clear in view of the following description. The second embodiment features two pairs of contacts 150, each pair located at one end of the battery receptor 116. Each pair of contacts 150 is made up of an electrically conductive flat contact 200 and an electrically conductive retainer member contact 202 (FIGS. 4 and 6).

For the conventional battery arrangement shown in FIG. 1, the two flat contacts 200 are electrically connected to the positive side of the battery receptor while the two retainer member contacts 202 are electrically connected to the negative side of the battery receptor, as shown schematically in FIG. 6.

Flat contact 200 and retainer member contact 202 of each pair of contacts 150 may be independently mounted substantially parallel to and somewhat offset from each other, as shown schematically in FIG. 6. Preferably, flat contact 200 and retainer member contact 202 of each pair of contacts 150 are connected to each other with the desirable spacing, H, between them (FIG. 5). Most preferably, a suitable insulating material 210 is interposed between flat contact 200 and retainer member contact 202 of each pair of contacts 150 to ensure that the two are electrically isolated from each other. Most preferably, retainer member contact 202 and insulating material 210 are dimensioned so that inward-facing edge of retainer member contact 202 is receded so that the inward-facing edge of insulating material 210 extends inwardly beyond the edge of retainer member contact 202, as shown in FIGS. 4–6.

Figure 7:
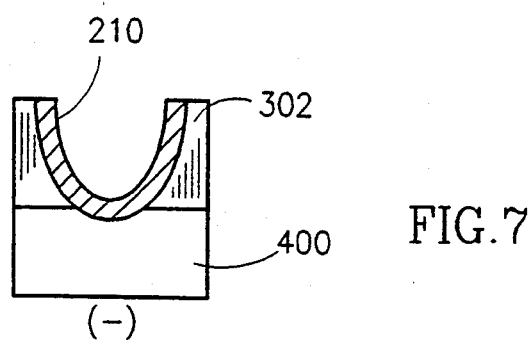
FIG. 7 shows another configuration of one of the two contacts of the pair of contacts according to the second embodiment of the present invention.

Alternatively or additionally, various guides may be provided to ensure that positive end 14 of battery 10 is not able to contact retainer member contact 202 and is only able to contact one of flat contacts 200. Still alternatively or additionally, the retainer member contact can be configured as shown in FIG. 7 wherein modified retainer member contact 302 includes conducting material only on its lower portion 400 while its upper portion is made of, or is coated by, an electrically insulating material to avoid accidental electrical contact between positive end 14 of battery 10 with modified retainer member contact 302.

The distance, H, between flat contact 200 and retainer member contact 202 of each pair of contacts 150 is selected to be less, preferably from about 0.25 to about 0.75, most preferably about one half, of the axial distance, L, from the anterior end of the body of battery 10 to the end of positive end 14 (FIG. 1).

In operation, a battery receptor according to the second embodiment of the present invention would operate as follows. When battery 10 (FIG. 1) is inserted into receptor 116 (FIG. 6) such that positive end 14 is directed to the left then negative end 12 of battery 10 abuts against the fight retainer member contact 202. Because of the cutout shape of left retainer member contact 202, positive end 14 of battery 10 is not retained by left retainer member contact 202 but rather penetrates the plane formed by left retainer member contact 202 and contacts left flat contact 200. In this position, positive end 14 of battery is properly connected to positive left flat contact while negative end 12 of battery 10 properly contacts negative right retainer member contact 202.

Similarly, if battery 10 is inserted so that positive end 14 is to the right, positive end 14 of battery is properly connected to positive right flat contact while negative end 12 of battery 10 properly contacts negative left retainer member contact 202. It will be readily understood that when batteries are used which have a configuration which is opposite that shown in FIG. 1, the opposite polarity must be used with respect to flat contacts 200 and retainer member contacts 202.

Thus, regardless of in which orientation battery 10 is inserted, the polarity of battery receptor 116 is correct and is achieved without the need to switch polarity and without the use of switches or other moving parts.

While the invention has been described with respect to a limited number of embodiments, it will be appreciated that many variations, modifications and other applications of the invention may be made.

What is claimed is:

1. A battery receptor to render operative an inserted battery having a protruding portion and a flat portion regardless of the orientation of the inserted battery, comprising:
   (a) a first pair of contacts mounted at one end of the receptor for accommodating one end of the battery;
   (b) a second pair of contacts mounted at the other end of the receptor for accommodating the other end of the battery;
   each of said pair of contacts characterized in that each pair includes:
   (i) an electrically conductive retainer member rigidly connected to, or integrally formed with, the battery receptor, said retainer member being in electrical contact with a first receptor electrical contact, said retainer member being sized and shaped to retain the flat end of the battery but not the protruding end of the battery; and
   (ii) an electrically conductive flat contact rigidly connected to, or integrally formed with, said receptor, said flat contact being in electrical contact with a second receptor electrical contact, said fiat contact being adjacent to, and separated from, said retainer member and on the side of said retainer member away from the battery.

2. A battery receptor as in claim 1, wherein each of said retainer elements is formed with a cutout sized to allow the protruding portion of the battery to penetrate the plane of said retainer element.

3. A battery receptor as in claim 1, wherein the protruding portion of the battery is the positive end of the battery and said retainer members are in electrical contact with the positive contact of said receptor.

4. A battery receptor as in claim 1, wherein the protruding portion of the battery is the negative end of the battery and said retainer members are in electrical contact with the negative contact of said receptor.

5. A battery receptor as in claim 1, wherein said retainer member and said flat contact of each of said pair of contacts are rigidly connected to each other.

6. A battery receptor as in claim 5, wherein each of said pair of contacts features an electrically insulating material interposed between said retainer member and said flat contact.

7. A battery receptor as in claim 6, wherein the inner-facing edge of said insulating material extends inward beyond the inward-facing edge of said retainer member.

8. A battery receptor as in claim 5, wherein the separation between said retainer member and said fiat contact of each of said pair of contacts is related to the axial extent of the protruding portion of the battery.

9. A battery receptor as in claim 8, wherein said separation is from about 0.25 to about 0.75 of the axial extent of the protruding portion of the battery.

10. A battery receptor as in claim 8, wherein said separation is about one half of the axial extent of the protruding portion of the battery.

* * * * *